July 9, 1929.　　　　S. WEIN　　　　1,720,654
PHOTO ELECTRIC CELL
Filed May 13, 1925
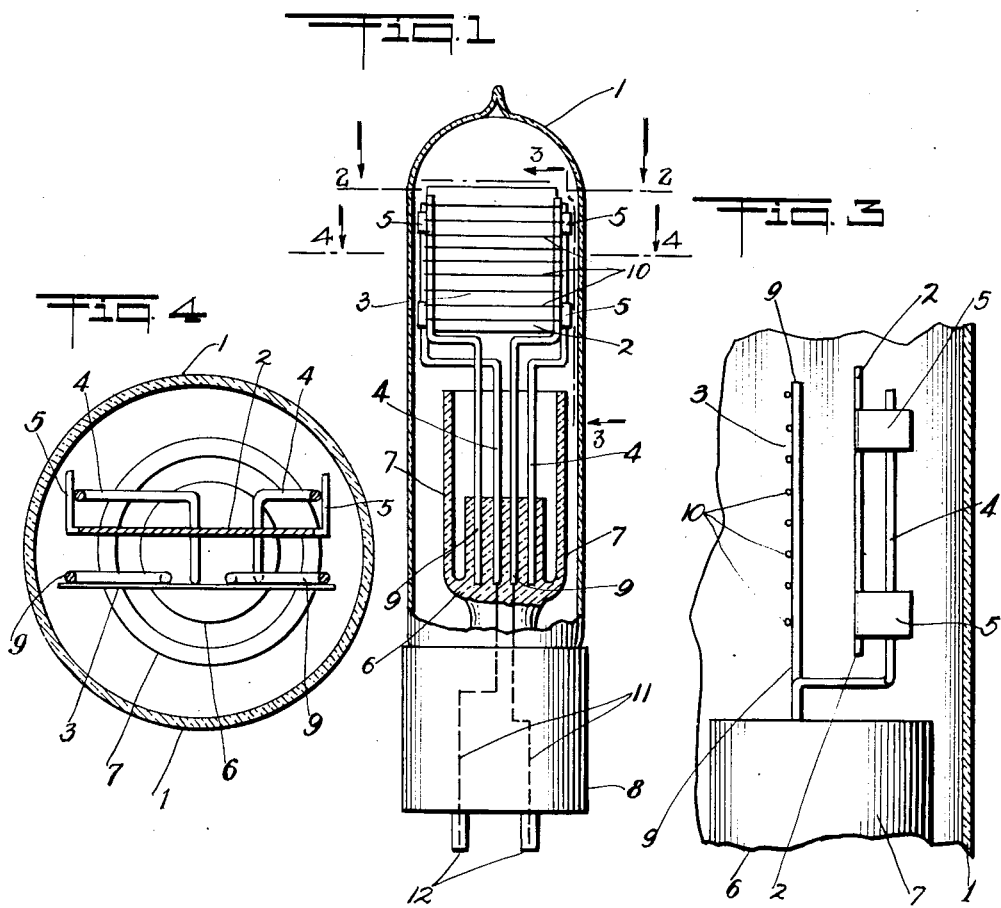
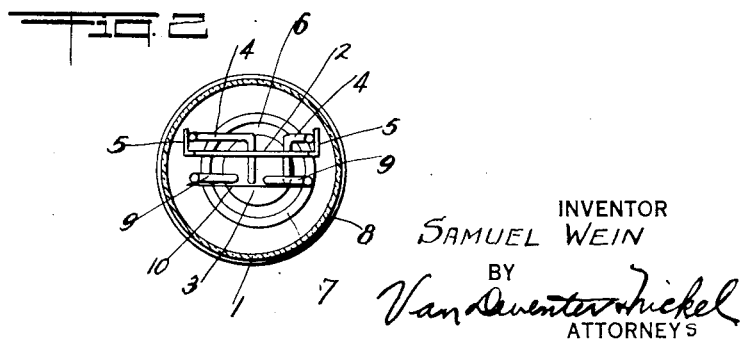
INVENTOR
SAMUEL WEIN
BY
Van Deventer Hickel
ATTORNEYS Patented July 9, 1929.

1,720,654

UNITED STATES PATENT OFFICE.

SAMUEL WEIN, OF NEW YORK, N. Y., ASSIGNOR TO RADIO PATENTS CORPORATION, OF NEW YORK, N. Y., A CORPORATION OF NEW YORK.

PHOTO-ELECTRIC CELL.

Application filed May 13, 1925. Serial No. 30,060.

My invention relates to photo-electric cells, and more particularly to the construction as well as the method of making such cells.

An object of my invention is to provide a suitable light-sensitive material for coating an electrode of a photo-electric cell.

Another object of my invention is to provide a suitable support for mounting the electrodes of a photo-electric cell.

Yet another object of my invention is to provide a photo-electric cell which is strong in construction, and one that is not liable to get out of order, even after long and continued use.

A further object of my invention is to obviate the peculiar tendency of these types of cells to store electrostatic charges in the cell. This electrostatic charge is largely due to the fact that the light-sensitive electrode of the cell constitutes a relatively large part of the cell.

With these and other objects in view which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements to the particular constructions, which for the purpose of explanation, have been made the subject of illustration.

In the drawings:

Figure 1 is a side elevational view partly in transverse section;

Figure 2 is a horizontal sectional view along the line 2—2 of Figure 1, looking in the direction of the arows;

Figure 3 is a fragmentary sectional view along the line 3—3 of Figure 1;

Figure 4 is a horizontal sectional view along the line 4—4 of Figure 1, looking in the direction of the arrows.

Referring to the drawings, and more particularly to Figure 1, I have shown my photo-electric cell comprising an evacuated glass tube or bulb 1 having electrodes 2 and 3 mounted therein. The electrode 2 is formed of a nickel or other metal plate having a suitable coating or film of light-sensitive material deposited on its surface.

This plate electrode is attached to its supports 4 by means of the projecting arms 5. The supports 4 are embedded in a sealed-in stem or projection 6 of the bulb 1 formed with an enveloping sleeve or rim 7. The bulb 1 is cemented or otherwise affixed to a cylindrical band or base 8.

The electrode 3 is mounted parallel to the plate electrode upon vertical rods or supports 9, embedded in the stem 6; and is made in the form of a grid or collector having a series of parallel wires 10 extending between the supports 9. Suitable sealed-in leads 11 connect the plate electrode 2 and the grid 3 with terminals 12 at the base of the tube, which is adapted to be easily inserted in a socket or other receptacle connected with an electrical circuit.

The grid or collector 3 is mounted near the plate electrode and lies in the path of the light rays which strike the plate.

A film or coating of any of the following metals or the corresponding hydrides (reaction product between the metal and hydrogen during an electrical brush discharge) can be deposited on the nickel plate 2 and produce ideal results, Na, K, Li, Cs, Ru, Ca, Sr, Ba, Tl, Ga, Zn, etc. Any of the metals here designated by their conventional chemical symbols may be deposited on the nickel plate by means of distillation.

I have found that by adding an organic reducing agent to any suitable metallic salt which has been deposited on the nickel plate, and subjecting this to hydrogen and electrical brush discharge, I can cause the corresponding metallic film or its hydride to be formed on the face of the nickel plate.

As organic reducing agents I prefer to use hydroxylamine, hydrazine, phenyl hydrazine or its corresponding hydrochloride, or sulphate, or I can employ if I choose invert sugar, or formaldehyde.

The procedure in such a case is to mix a small amount of the reducing agent with a salt of the metal to be used as the light-sensitive material. This is applied in any convenient manner to the nickel plate. By metallic salt I refer to a nitrate, chloride, bromide, carbonate, sulphate, or other salt of the metal.

After the metallic salt film is deposited, the tube is degassified in the usual manner by heating.

Thereafter a steady flow of hydrogen is permitted to flow through the vessel containing the electrodes, and at the same time a potential of between 300 and 550 volts D. C., (depending on the prevailing conditions) is impressed upon the nickel plate carrying the film of metallic salt and the grid or collector. This operation first transforms the metallic salt to the metallic state, and by continuing this process, the metal is then converted into the corresponding hydride, which is the most sensitive.

The hydrogen is now replaced with any inert gas, such as neon, argon, krypton, helium, etc., and the tube is sealed off and is then ready for use in electrical circuits.

During the process of manufacturing, the cell is tested at least before the cell is sealed off, so that if the highest sensitiveness is not attained, then the process can be repeated as often as is required so as to reach the desired sensitiveness.

In the manufacture of photo electric cells, use is now made of any one of the alkali metals and distilling or redistilling it upon the inside of a glass or quartz vessel, so as to form the usual metallic hydride (sensitizer); before filling this vessel with an inert gas.

This type of photo electric cell has the peculiar property of containing what might be termed a slight "dark current", primarily due to the charge on the gas itself. It has been proposed to insert a platinum sleeve to eliminate this so-called "dark current". While this has been accomplished to some extent, yet the complete elimination of the "dark current" has not been attained. Furthermore, the cost of manufacturing such cells is considerably increased by the presence of this sleeve of platinum.

I obviate the "dark current" such as is found in the foregoing types of photo electric cell by coating a metal plate or foil with any of the photo electric metals or compounds as above set forth, and not coating the inside of the glass vessel.

The method of construction may be summarized as follows:

I first coat a nickel plate with barium oxalate, strontium oxalate, calcium oxalate, etc. This may be done in any manner in common use.

The nickel plate may be coated over with any of the foregoing oxalates or mixtures thereof.

In the place of a nickel plate, I can also use platinum or aluminum with equal results.

The nickel plate with the foregoing oxalates contains either phenyl hydrazine or the corresponding hydrochloride or sulphate.

The nickel plate containing the metallic oxalate and phenyl hydrazine is now mounted into the glass tube as shown in the diagram and subjected to the usual process of degasification and at the same time bombardation.

Thereafter the corresponding hydride is formed by passing hydrogen through the tube after degasification and during the process of bombardation.

In the tube is now passed an inert gas such, for instance, as neon, argon, krypton or helium and the tube is sealed off when it is ready for use.

I have found also that heating in the presence of hydrogen will serve to form the light-sensitive metallic film on the plate, the same as by the use of electric brush discharge, when the addition of an organic reducing agent to a metallic salt deposited on the plate has been made, and treatment accomplished as described above.

My photo-electric cell is strong and compact and is very sensitive to the influence of light, of even very weak intensity.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having described my invention, what I believe to be new and desire to secure and protect by Letters Patent of the United States is:—

1. The method of forming a light-sensitive coating on an electrode which consists in depositing on said electrode a metallic salt mixed with an organic reducing agent and subjecting the electrode, the salt and the reducing agent to electric brush discharge in the presence of hydrogen whereby the coating on the electrode is converted into a film of metallic hydride.

2. In a photo-electric cell comprising a tube, with a plate and a grid within the tube, the process of forming on said plate a film of metallic hydride by depositing on it a salt of the desired metal and reducing this salt while hydrogen is passed into the tube.

3. In a photo-electric cell comprising an evacuated tube, a plate electrode, and a grid electrode, the process of coating said plate electrode with the hydride of an alkali metal before the evacuation of the tube by depositing a coating of an alkali metal salt on said plate and reducing it while hydrogen is passed into the tube and during the passage of an electric discharge from said grid to said plate.

4. In a photo-electric cell comprising a tube and a plate and grid therein the process of forming a film of potassium hydride on the plate by applying a coating of a potassium salt on said plate and reducing it while hydrogen is passed into the tube.

5. The process of coating an electrode with light sensitive material which consists in depositing a coating or an alkali metallic salt with an organic reducing agent on said electrode and subjecting it to the action of hydrogen to cause the coating to be converted into a metallic hydride film on said electrode.

Signed at New York, in the county of Bronx and State of New York, this 9th day of May, A. D. 1925.

SAMUEL WEIN.